(12) United States Patent
Tageman et al.

(10) Patent No.: US 9,712,205 B2
(45) Date of Patent: Jul. 18, 2017

(54) DUPLEX UNIT

(71) Applicant: TELEFONAKTIEBOLAGET L M ERICSSON (PUBL), Stockholm (SE)

(72) Inventors: Ola Tageman, Göteborg (SE); Mats Rydström, Billdal (SE); Yinggang Li, Askim (SE); Dan Weinholt, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/898,605

(22) PCT Filed: Jun. 18, 2013

(86) PCT No.: PCT/EP2013/062602
§ 371 (c)(1),
(2) Date: Dec. 15, 2015

(87) PCT Pub. No.: WO2014/202121
PCT Pub. Date: Dec. 24, 2014

(65) Prior Publication Data
US 2016/0134325 A1    May 12, 2016

(51) Int. Cl.
    *H04B 1/44*     (2006.01)
    *H04B 1/46*     (2006.01)
    *H04B 1/04*     (2006.01)
    *H04B 1/10*     (2006.01)
    *H04B 1/525*    (2015.01)
    *H04L 5/14*     (2006.01)

(52) U.S. Cl.
    CPC ............ *H04B 1/525* (2013.01); *H04L 5/14* (2013.01)

(58) Field of Classification Search
    CPC .................................. H04B 1/525; H04L 5/14
    USPC .................................. 455/78–83, 114.2, 296
    See application file for complete search history.

(56) References Cited

U.S. PATENT DOCUMENTS

| 5,691,978 A | 11/1997 | Kenworthy |
| 2004/0014449 A1* | 1/2004 | Adachi ............... H04B 1/525 455/296 |

(Continued)

FOREIGN PATENT DOCUMENTS

WO    WO 2008/105742 A1    9/2008

OTHER PUBLICATIONS

Choi et al. Achieving Single Channel, Full Duplex Wireless Communication. Proceedings of the Annual International Conference on Mobile Computing and Networking. MOBICOM—MOBICOM'10 and MOBIHOC'10—Proceedings of the 16th Annual International Conference on Mobile Computing and Networking and 11th ACM International Symposium. Sep. 20, 2010 (Sep. 20, 2010).

*Primary Examiner* — Simon Nguyen

(57) ABSTRACT

A duplex unit allowing simultaneous transmission and reception of microwave signals on at least partly overlapping frequency bands, comprising an interference canceller unit and a control unit, the duplex unit being arranged to receive a transmit signal and to output a first part of the transmit signal at an antenna port, the duplex unit further being arranged to receive a receive signal comprising a payload signal at the antenna port, and to output a combination of the receive signal and a filtered transmit signal as an interference suppressed receive signal of the duplex unit.

16 Claims, 11 Drawing Sheets

(56) References Cited

U.S. PATENT DOCUMENTS

| | | |
|---|---|---|
| 2005/0107051 A1 | 5/2005 | Aparin et al. |
| 2006/0040620 A1 | 2/2006 | Jung et al. |
| 2008/0219377 A1* | 9/2008 | Nisbet .................... H04B 1/525 375/296 |
| 2008/0272959 A1* | 11/2008 | Meharry ................. G01S 7/034 342/174 |
| 2009/0323856 A1* | 12/2009 | McCallister ........... H04B 1/525 375/296 |
| 2010/0048146 A1* | 2/2010 | McCallister ........... H04B 1/525 455/78 |
| 2011/0134810 A1 | 6/2011 | Yamamoto et al. |
| 2011/0256857 A1* | 10/2011 | Chen ...................... H04B 1/525 455/422.1 |
| 2012/0163245 A1* | 6/2012 | Tone ...................... H04B 1/525 370/277 |
| 2012/0182906 A1 | 7/2012 | Knox |
| 2012/0201153 A1 | 8/2012 | Bharadia et al. |
| 2013/0301488 A1* | 11/2013 | Hong ....................... H04B 1/56 370/278 |
| 2014/0247757 A1* | 9/2014 | Rimini .................... H04B 1/525 370/278 |
| 2014/0328222 A1* | 11/2014 | Mao ...................... H04L 5/1461 370/278 |

\* cited by examiner

DUPLEX UNIT

TECHNICAL FIELD

The present disclosure relates to a duplex unit, a microwave transceiver, and a method for the simultaneous transmission and reception of microwave signals.

BACKGROUND

A duplex unit is a device which enables transmission and reception of radio signals using a single antenna arrangement. Such transmission and reception is often referred to as duplexing. Radio communications systems in general, and microwave communications systems in particular have traditionally utilized so-called frequency duplexing, i.e. using separated transmit and receive frequency bands, as a means to separate an often comparably weak received radio signal from a comparably strong transmitted signal. However, frequency duplexing is wasteful in terms of frequency spectrum, since the frequency bands used by each of the transmit signal and the receive signal may not overlap.

The total number of antennas used by a communication system, particularly by a microwave communication system, is an important aspect which contributes to the total cost of the communication system. Hence, all other things being equal, a communication system which only uses a single antenna arrangement per transceiver is preferred over a communications system which utilizes a plurality of antenna arrangements at each transceiver.

In the article "Achieving Single Channel, Full Duplex Wireless Communication", J. Choi, M. Jain, K. Srinivasan, P. Levis, and S. Katti, Proc. MobiCom'10, Sep. 20-24, 2010, Chicago, Ill., U.S.A., there is disclosed a system for simultaneous reception and transmission of radio signals in overlapping frequency bands. However, the system disclosed in this document needs at least three separate antennas in order to enable the reception and transmission of radio signals in overlapping frequency bands.

SUMMARY

It is an object to obtain a duplex unit which obviates at least some of the disadvantages mentioned above, and to thereby obtain an improved duplex unit which allows the simultaneous transmission and reception of radio signals on at least partly overlapping frequency bands using one and the same antenna.

This object is obtained by means of a duplex unit for the simultaneous transmission and reception of microwave signals. The duplex unit comprises an interference canceller unit and a control unit. The interference canceller unit comprises a duplex coupler with an antenna port, an input port, a first and a second output port and a return port. The duplex coupler is arranged to receive a transmit signal at the input port and to output a first part of the transmit signal at the antenna port, and to suppress leakage of the transmit signal to the first output port. The duplex coupler is also arranged to output a second part of the transmit signal at the second output port to be received by a first adaptive filter comprised in the interference cancellation unit. The first adaptive filter is arranged to output a first filtered signal to the return port of the duplex coupler. The duplex coupler is further arranged to receive a receive signal comprising a payload signal at the antenna port, and to output a combination of the receive signal and the first filtered signal as an interference suppressed receive signal on the first output port. The control unit is arranged to use the interference suppressed receive signal to adapt the first adaptive filter by means of a first control signal to make the interference suppressed receive signal equal to the payload signal.

According to an aspect, the duplex unit is arranged for simultaneous transmission and reception of microwave signals on at least partly overlapping frequency bands.

According to an aspect, the first adaptive filter is an analog adaptive filter arranged to receive and to filter an analog second part of the transmit signal, and to output an analog first filtered signal.

According to an aspect, the second output port and the return port constitutes a single physical interface. Also, the first adaptive filter of the interference canceller unit comprises a first reflection type filter arranged to receive the second part of the transmit signal and to output a reflected filtered transmit signal back to said single physical interface as the first filtered signal.

According to an aspect, the first adaptive filter comprises a transmission type filter. The duplex coupler further comprises a first combiner unit arranged to combine the receive signal and the first filtered signal to obtain the interference suppressed receive signal, as well as to physically separate the second output port and the return port. The duplex coupler further comprising an antenna coupler. The antenna coupler is arranged to provide a signal conduit from the input port to the antenna port and also from the input port to the second output port, as well as from the antenna port to the combiner, while blocking a signal conduit from the input port to the combiner.

According to an aspect, the first adaptive filter comprises a second reflection type filter and a circulator. The circulator being arranged to provide a signal conduit from the second output port to an input port of the second reflection type filter, and also to provide a signal conduit from the output port of the second reflective filter to the return port, and to block a direct signal conduit from the second output port to the return port.

According to an aspect, the reflection type filter comprises a chain of series-connected tunable mismatch circuits connected to a reflection-less termination unit arranged to terminate said chain. The chain of series-connected tunable mismatch circuits is arranged to generate a back-reflected signal with tunable phase and amplitude.

According to an aspect, the reflection type filter comprises a branching-and-delay network connected to at least one tunable mismatch circuit. The branching-and-delay network is arranged to divide a filter input signal and to forward a part of the divided filter input signal to each of the at least one tunable mismatch circuits. The branching-and-delay network is also arranged to combine at least one output reflected signal from the at least one tunable mismatch circuit into an output first filtered signal. Each of the at least one tunable mismatch circuit is arranged to generate a reflected signal with tunable phase and amplitude.

According to an aspect, the transmission type filter comprises a filter with the topology of a Finite Impulse Response filter, a FIR filter, with at least two filter taps. Each of the taps are arranged to receive and to individually adjust the second part of the transmit signal in terms of gain and phase by the first control signal. The transmission type filter is also arranged to combine an output signal from each filter tap to obtain the first filtered signal.

Thus, by adapting the first adaptive filter, i.e., adapting the transfer function of the first adaptive filter, to make the interference suppressed receive signal equal to the payload signal, interferences comprised in the receive signal are suppressed. An example of such interference being a leakage of the transmit signal into the receive signal, which transmit signal leakage is suppressed by the above mentioned adaptation and filtering.

Thus, by means of the duplex unit described above, simultaneous transmission and reception of microwave signals on at least partly overlapping frequency bands is enabled using only one antenna.

The receive signal comprises a payload as mentioned, received via the connected antenna, but is also likely to contain a number of copies of the transmit signal—each with a given phase-shift, delay, and attenuation. One such copy can be expected to arise due to un-intentional signal leakage in the duplex coupler, i.e. between the input port of the duplex coupler and the first output port. Other such copies can be expected to arise due to signal reflections in e.g. waveguide transitions, bends, feeders, reflectors and any radome. Signal reflections may of course also arise in the physical surrounding of the antenna, e.g. due to reflective objects and heavy rain in the antenna surroundings.

A simple adaptive filter, such as a transmission type filter having a single tap, or a reflection type filter with a single mismatch circuit, is not able to generate very complex functions of a filter input signal. Thus, the interference suppression which is possible to achieve using a simple adaptive filter is limited, at least in case of complex interferences. However, since the adaptive filters disclosed herein according to aspects comprise a plurality of filter taps with varying delay, or a plurality of mismatch circuits and delay sections, more complicated filtering functions can be generated. Hence an improved interference suppression is possible to obtain.

In addition, by means of the use of an adaptive filter, an additional advantage is achieved in that changes in interference conditions over time can be adapted to continuously over time and therefore interference can be more effectively suppressed compared to a fixed filter implementation.

Due to the adaptation of the first adaptive filter, un-wanted signal components comprised in the receive signal will be suppressed in the interference suppressed receive signal by means of corresponding signal components of opposite phase comprised in the first filtered signal. Since this cancellation uses the transmit signal just before the antenna, i.e. after any power amplification, also the noise of the transmitter will be cancelled or suppressed in the interference suppressed receive signal.

There is also disclosed a microwave transceiver unit for the simultaneous transmission and reception of microwave signals on at least partly overlapping frequency bands. The transceiver unit comprises a modem unit and a duplex unit. The modem unit is arranged to generate a basic transmit signal and to receive a processed receive signal. The control unit of the duplex unit is arranged to generate a control signal based on a second control signal generated by the modem unit. The microwave transceiver unit also comprises a second adaptive filter and a transmit component. The transmit component is arranged to receive the basic transmit signal from the modem and to generate a transmit component output signal arranged to be divided into the transmit signal of the duplex unit and into an input signal of the second adaptive filter. The microwave transceiver unit is also arranged to delay the interference suppressed receive signal of the duplex unit by a pre-determined amount set in relation to the delay of the second adaptive filter, and to also obtain as the processed receive signal a combination of the delayed interference suppressed receive signal and a second filtered signal from the second adaptive filter. The modem unit is arranged to adapt the second adaptive filter by a second control signal, and to generate the second control signal to make the processed receive signal equal to the payload signal.

Thus, in a manner similar to the interference suppression performed by means of the first adaptive filter comprised in the duplex unit described above, the second adaptive filter comprised in the disclosed microwave transceiver is used in order to suppress any residual interference in the interference suppressed receive signal.

The object stated above is also obtained by a method for the simultaneous transmission and reception of microwave signals on at least partly overlapping frequency bands. The method comprises the steps of receiving, in a duplex coupler, a microwave transmit signal, and transmitting, from said duplex coupler, a first part of the microwave transmit signal via an antenna. The method also comprises the steps of filtering, by a first adaptive filter, a second part of the microwave transmit signal in order to generate a first filtered signal, and also receiving a receive signal comprising a payload signal via the antenna, as well as determining a combination of the first filtered signal and the delayed composite signal to obtain an interference suppressed receive signal. The method also comprises the steps of using the interference suppressed receive signal as a received microwave signal, and adapting the first adaptive filter by means of the received microwave signal in order to make the interference suppressed receive signal equal to the payload signal.

According to an aspect, the feature of determining a combination of the first filtered signal and the delayed composite signal constitutes making a linear combination of the first filtered signal and the delayed composite signal. According to an aspect, the step of filtering further comprises using as said first adaptive filter an analog tunable filter arranged to generate an analog filtered output signal.

According to an aspect, the method further comprises the steps of generating a basic microwave transmit signal, processing said basic transmit signal by a transmit component to generate said microwave transmit signal, and filtering, by a second adaptive filter, a part of the microwave transmit signal to generate a second filtered signal. The method further comprises the steps of delaying the interference suppressed receive signal by a delay corresponding to the delay incurred by the second adaptive filter, and determining a combination of the second filtered signal and the interference suppressed receive signal to obtain a processed receive signal, as well as adapting the second adaptive filter by means of the processed receive signal to make the processed receive signal equal to the payload signal, and also using the processed receive signal as a refined received microwave signal.

BRIEF DESCRIPTION OF THE DRAWINGS

The present technique will be described in more detail in the following, with reference to the appended drawings, in which FIG. 1 schematically shows a duplex unit.

DETAILED DESCRIPTION

Figure 1:
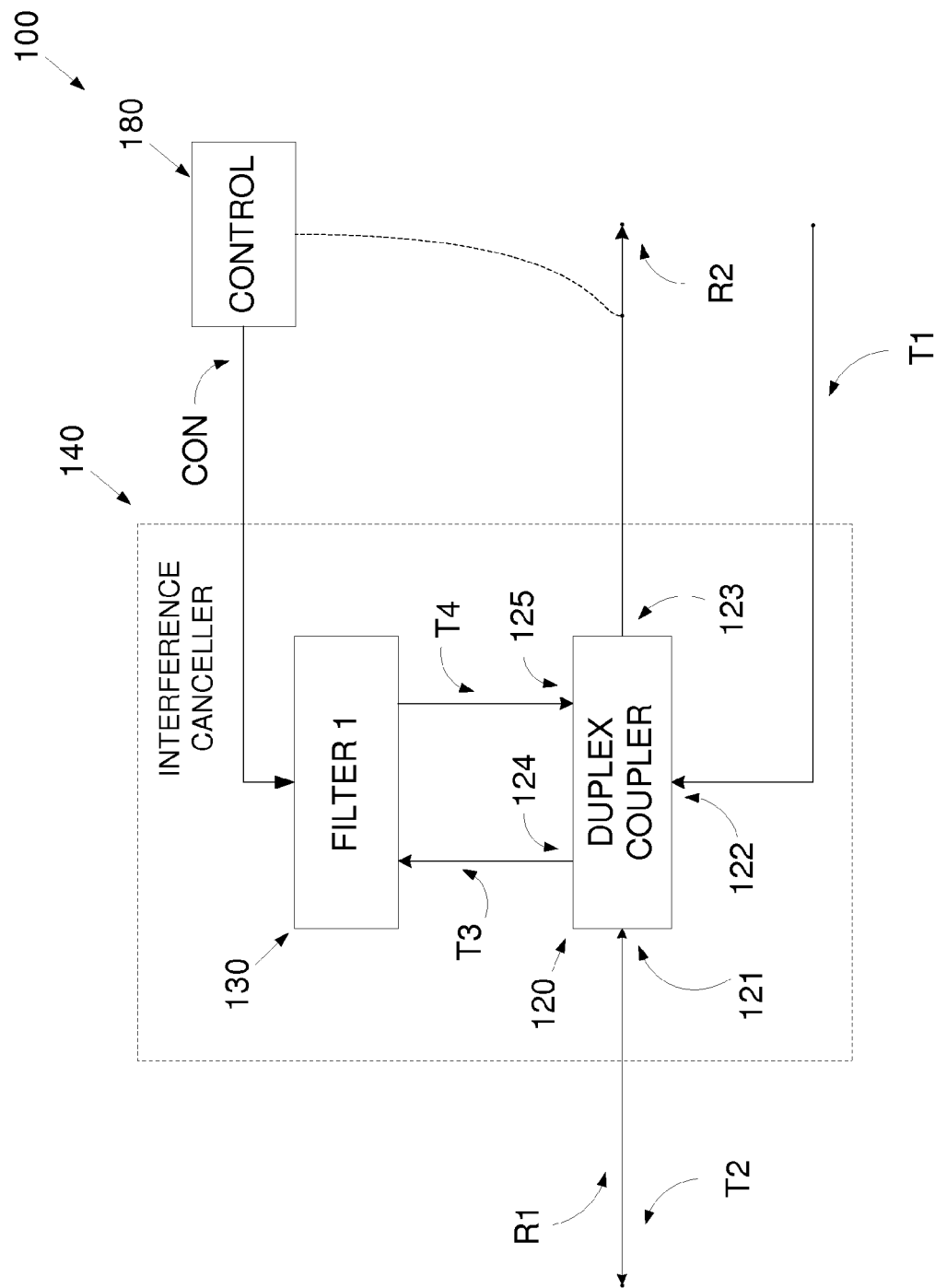

Embodiments of the present disclosure will be described more fully hereinafter with reference to the accompanying drawings, in which embodiments of the disclosure are shown. The disclosure may, however, be embodied in many different forms and should not be construed as being limited to the embodiments set forth herein. Like numbers in the drawings refer to like elements throughout.

The terminology used herein is for the purpose of describing particular embodiments only, and is not intended to limit the disclosure.

FIG. 1 shows a duplex unit 100 comprising a first adaptive filter 130 and a duplex coupler 120. Transmit signals T1 transmitted to the duplex unit 100 are arranged to be transmitted further onwards via the antenna port 121 of the duplex coupler 120, i.e. in practice via an antenna connected to the antenna port 121, while signals received by an antenna connected to the antenna port 121 are arranged to be output from the duplex unit 100 as an interference suppressed receive signal R2 after processing by the duplex unit 100.

According to an aspect, the duplex unit 100 is arranged to be used by a transceiver for simultaneous transmission and reception of radio signals, particularly microwave radio signals, using a single antenna unit connected to an antenna port 121 of the duplex coupler 120

Traditionally, signals which are to be transmitted T2 via the duplex unit 100 are separated in frequency or in polarization from signals received R1 by the duplex unit 100. However, as will be evident from the description below, the duplex unit 100 shown in FIG. 1 allows the use of transmit T2 and receive signals R1 without any such separation(s), without interference between transmitted T1 and interference suppressed receive signals R2.

It should however be noted that the transmit T2 and receive signals R1 in aspects of the disclosure occupy non-overlapping frequency bands. Thus, it is not necessary that the transmit T2 and receive R1 signals occupy partly overlapping frequency bands in order to use said duplex unit 100 in a communications transceiver.

The duplex coupler 120 is part of an interference canceller unit 140 comprised in the duplex unit 100. The duplex coupler 120 comprises an input port 122 arranged to receive a transmit signal (T1), as well as a first output port 123 arranged to output an interference suppressed receive signal (R2), and a second output port 124 arranged to output a second part of the transmit signal (T3). A signal which is input to the input port 122 of the duplex coupler 120 is split in two parts, not necessarily equal in power, such that a first part of the transmit signal T2 is forwarded to and output from the antenna port 121 and a second part T3 is forwarded to and output from the second output port 124 of the duplex coupler 120. There is isolation from the input port 122 to the first output port 123. A signal which is received on the antenna port 121 is forwarded to and output from the first output port 123 of the duplex coupler 120.

Various embodiments of the duplex coupler 120 are possible. According to embodiments, the duplex coupler 120 is implemented by a directional coupler, such as: a 90 degree hybrid device, a 180 degree hybrid device (rat-race), a magic-T device, waveguide hole coupler, coupled line coupler, Lange coupler, or a circulator combined with a power splitter.

According to an aspect, a pass-band filter, not shown in FIG. 1, is connected to the input port 122 of the duplex coupler 120, in order to suppress noise and unwanted mixing products in the transmit signal T1.

A first adaptive filter 130 is connected to the second output port 124 of the duplex coupler 120. The first adaptive filter 130 is arranged to receive the second part of the transmit signal T3 which, as mentioned above, comprises a part of the transmit signal T1. The first adaptive filter 130 is further arranged to filter the second part of the transmit signal T3 and to output a first filtered signal T4 to a return port 125 of the duplex coupler 120.

According to an aspect the first adaptive filter 130 is an analog filter which is adaptable in the sense that the transfer function of the filter is arranged to be determined by means of a first control signal CON, which first control signal CON the first adaptive filter 130 is arranged to receive. A detailed description of various embodiments of the first adaptive filter 130 and the generation of its control signal CON will be given below in connection to FIG. 5a, FIG. 5b, and FIG. 6.

The duplex unit 100 is arranged to combine, by the duplex coupler 120, the first filtered signal T4 and the receive signal R1 to obtain an interference suppressed receive signal R2. The interference suppressed receive signal R2 is arranged to be an output signal of the duplex unit 100.

According to an aspect, the combination of the first filtered signal T4 and the receive signal R1 constitutes a sum of the first filtered signal T4 and the receive signal R1.

According to an aspect, the interference suppressed receive signal R2 is arranged to be filtered by a second pass-band filter, not shown in FIG. 1, before being output as an output signal of the duplex device.

In order to adapt the transfer function of the first adaptive filter 130, a first control signal CON is arranged to be input to the first adaptive filter 130. This first control signal CON is generated by a control unit 180 comprised in the duplex unit 100.

According to an aspect, the control unit 180 is arranged to receive the interference suppressed receive signal, after filtering by the second pass-band filter in case such a pass-band filter is comprised, and to generate the first control signal CON based on observation of the interference suppressed receive signal.

In a first embodiment of the control unit 180, the control unit 180 comprises a digital signal processing, DSP, device in turn comprising an analog to digital converter, ADC, and a digital to analog converter, DAC. The DSP device is arranged to sweep a number of control parameters while observing the interference suppressed receive signal in order to minimize the power of the interference suppressed receive signal.

In a second embodiment of the control unit 180, the first control signal is output during calibration, e.g. initial calibration, of the duplex device 100. During calibration, a calibration signal is transmitted to the duplex unit 100 as the transmit signal T1, but no receive signal R1 are arranged to be received on the antenna port 121. The control unit 180 is therefore arranged to output a first control signal CON to adapt the transfer function of the first adaptive filter 130 such that the interference suppressed receive signal is zero or minimized in magnitude.

In a third embodiment of the control unit 180, a known signal, e.g. a known payload signal, is comprised in a receive signal R1 received on the antenna port 121 of the duplex coupler 121. In this third embodiment, the control unit 180 is arranged to output a first control signal CON to adapt the transfer function of the first adaptive filter 130 such that the interference suppressed receive signal R2 is equal to the known payload signal or as close as possible in some relevant signal distance metric such as in a squared Euclidean norm sense.

In a fourth embodiment of the control unit 180, the payload signal is not known and instead detected by the control unit 180, in which case the transfer function of the first adaptive filter 130 is adapted based on observation of the detected payload signal instead of a known payload signal.

According to an aspect, the control unit 180 is arranged to instead forward a received control signal to the first adaptive filter 130. The control signal received by the control unit 180 is then generated according to the embodiments of the control unit 180 described above in a secondary control unit disposed outside of the duplex unit 100.

By means of the duplex coupler 120, the first adaptive filter 130, and the control unit 180, the duplex unit 100 is able to suppress an unwanted signal component in a received signal R1 to make an interference suppressed receive signal R2, given that the unwanted signal component has originated in some deterministic way from the transmit signal T1. Thus, a transceiver using said duplex unit 100 may transmit and receive signals at the same frequency or at two partly overlapping frequency bands without the transmitted signal T1 interfering with the interference suppressed receive signal R2. However, as noted above, it is not necessary that transmit and receive signals occupy at least partly overlapping frequency bands in order for the duplex unit 100 to bring advantages when used in a communications system.

Further, this simultaneous transmission and reception of signals is performed by means of a single antenna connected to the duplex coupler 120 antenna port 121. Also, since interference suppression of the transmit signal T1 in the interference suppressed receive signal R2 is performed by the duplex unit 100, an ADC connected to the duplex unit 100 and arranged to receive the interference suppressed receive signal R2 will not need to be dimensioned to capture the whole receive signal R1 including the un-wanted transmit signal.

Figure 2:
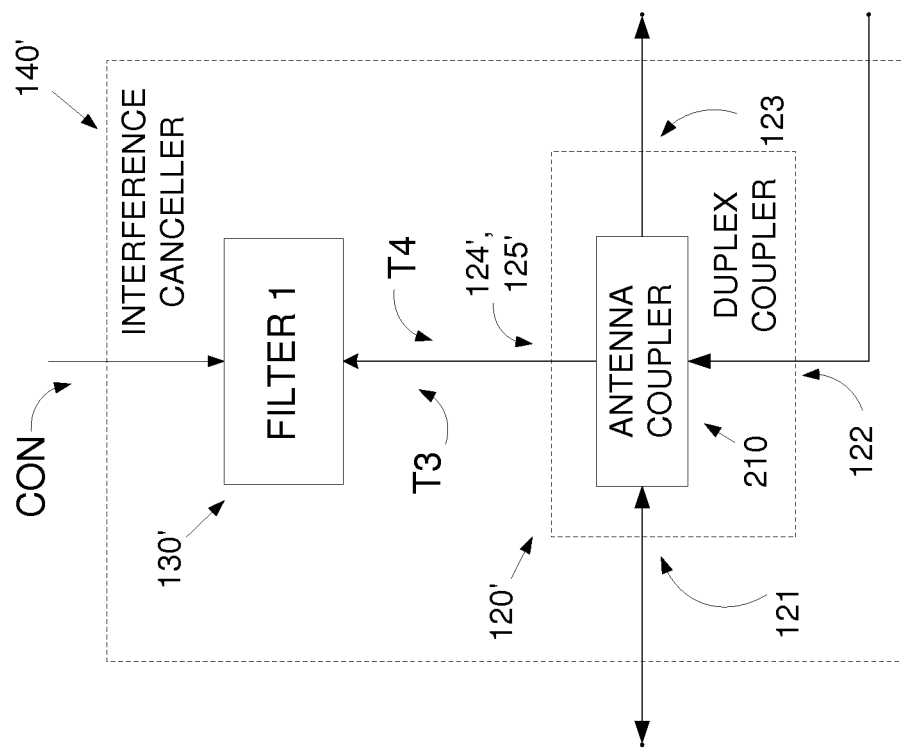
FIG. 2-4 shows embodiments of an interference canceller unit.

FIG. 2 shows an embodiment 140' of the interference canceller unit 140 shown in FIG. 1. According to this embodiment the first adaptive filter 130 in FIG. 1 is a first reflection type filter 130'. Consequently the second output port 124' and the return port 125' constitute a single physical interface. The first adaptive filter 130' is arranged to receive the second part of the transmit signal T3 and to output a reflected filtered transmit signal back to said single physical interface 124', 125' as the first filtered signal T4. The duplex coupler 120' here comprises an antenna coupler 210 arranged to provide a signal conduit from the input port 122 to the antenna port 121, and also a signal conduit from the input port 122 to the second output port 124', as well as a signal conduit from the antenna port 121 to the first output port 123, and a signal conduit from the return port 125' to the first output port 123, and to block a direct signal conduit from the first input port 122 to the first output port 123. A detailed description of various embodiments of the antenna coupler 210 will be given below in connection to FIG. 11a and FIG. 11b.

Figure 3:
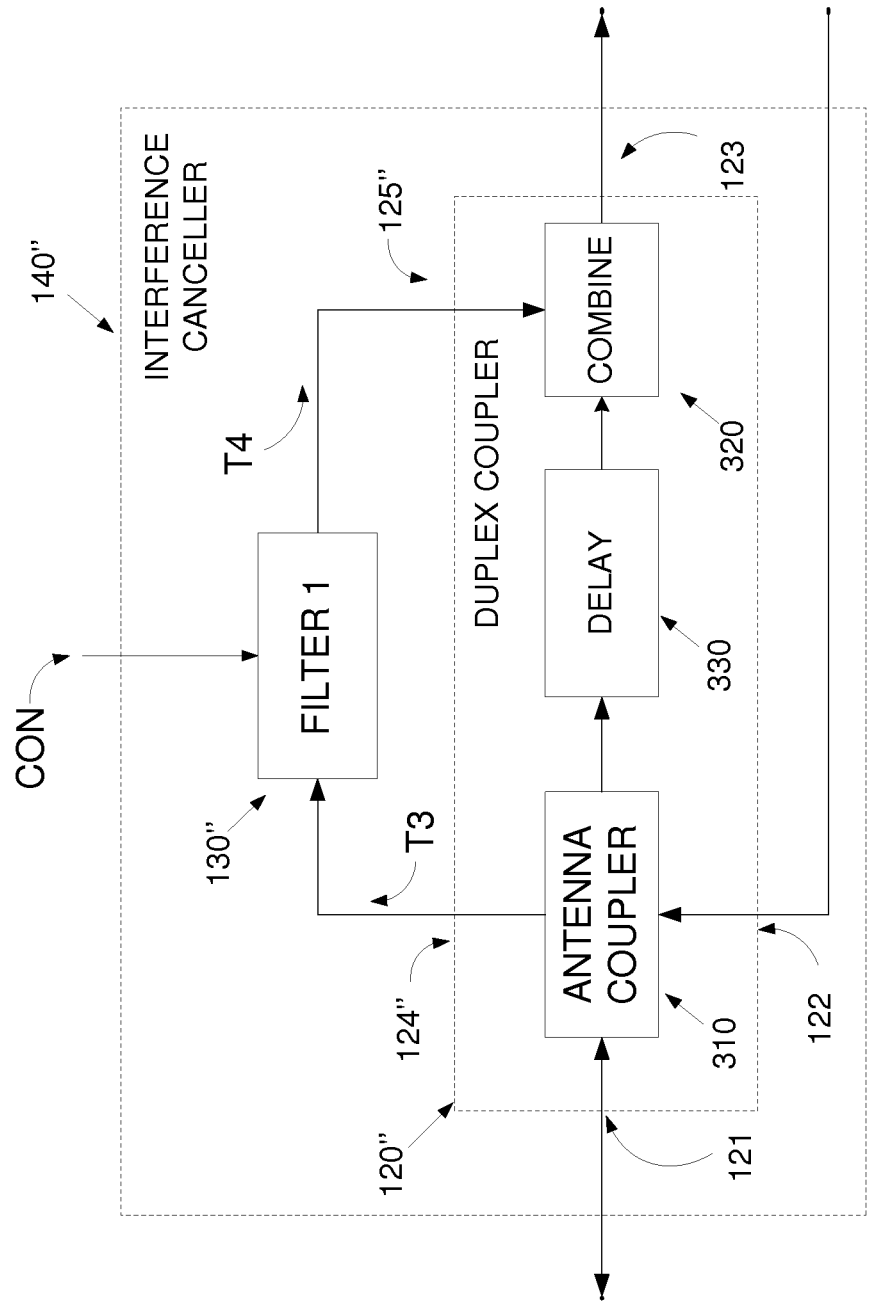

FIG. 3 shows an embodiment 140" of the interference canceller unit 140 shown in FIG. 1. Here the first adaptive filter 130" constitutes a transmission type filter arranged to receive the second part of the transmit signal T3 and to filter the second part of the transmit signal T3 to generate a first filtered signal T4. The first filtered signal T4 is transmitted from the first adaptive filter 130" to the return port 125" of the duplex coupler 120".

The duplex coupler 120" shown in FIG. 3 further comprises a first delay unit 330 arranged to receive the receive signal R1 forwarded from the antenna port 121, and to delay this signal by an amount corresponding to the delay incurred by the first adaptive filter 130", so that the first filtered signal T4 output from the first adaptive filter 130" and the delayed signal output from the first delay unit 330 will be aligned in time at the first combiner unit 320.

The first combiner unit 320 is arranged to determine the total of the first filtered signal T4 and the delayed receive signal, and to output the total as the interference suppressed receive signal R2 on the first output port 123. The first combiner unit 320 can be embodied in a number of different ways, such as a Wilkinson power combiner or coupled line coupler. In another embodiment, the total of the filtered signal T4 and the delayed receive signal may be obtained by means of a subtraction operation instead, in which case the first adaptive filter 130" is adapted such that a signal rotation of 180 degrees is applied to the filtered signal T4 as compared to the case of having an addition operation in the first combiner unit 320. Thus, it should be understood that an adaptive filter such as the first adaptive filter 130" and a combiner unit such as the first combiner unit 320 may be arranged to provide a combined addition operation although the actual combiner unit implements something other than an addition operation, e.g., a subtraction operation instead of an addition operation.

The interference suppressed receive signal R2 is suitably arranged to be filtered by a second pass-band filter, not shown in FIG. 3, before being used as an output signal of the duplex unit 100. This will reduce the impact of transmitter noise, transmitter spuriouses, and interferers not related to the transmitter.

Figure 4:
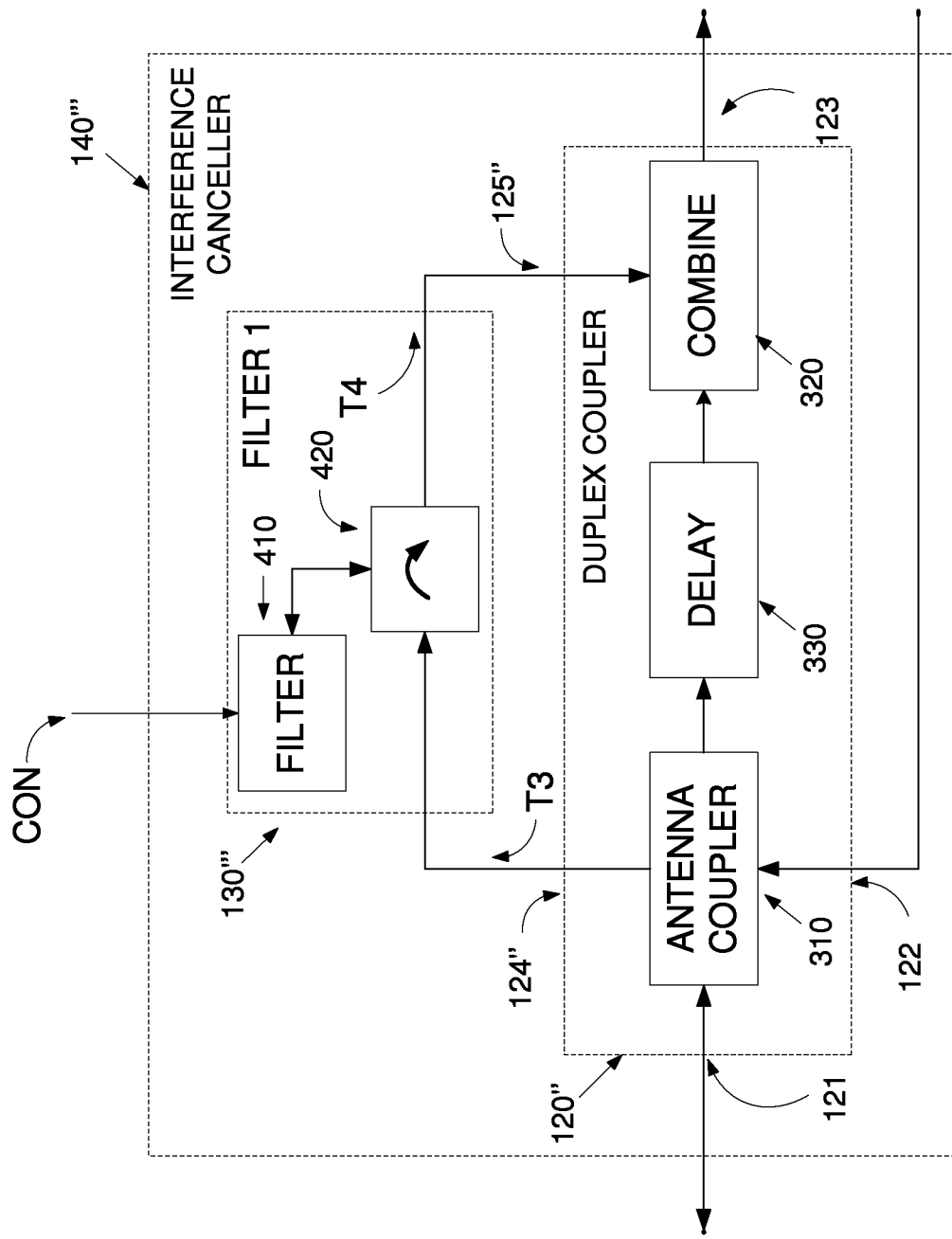

FIG. 4 shows an aspect of the interference canceller unit 140" wherein the first adaptive filter 130" comprises a second reflection type filter 410 and a circulator 420. The circulator 420 being arranged to provide a signal conduit from the second output port 124" of the duplex coupler 120" to an input port of the second reflection type filter 410, and also to provide a signal conduit from the output port of the second reflective filter 410 to the return port 125", and to block a direct signal conduit from the second output port 124" to the return port 125".

Figure 5B:
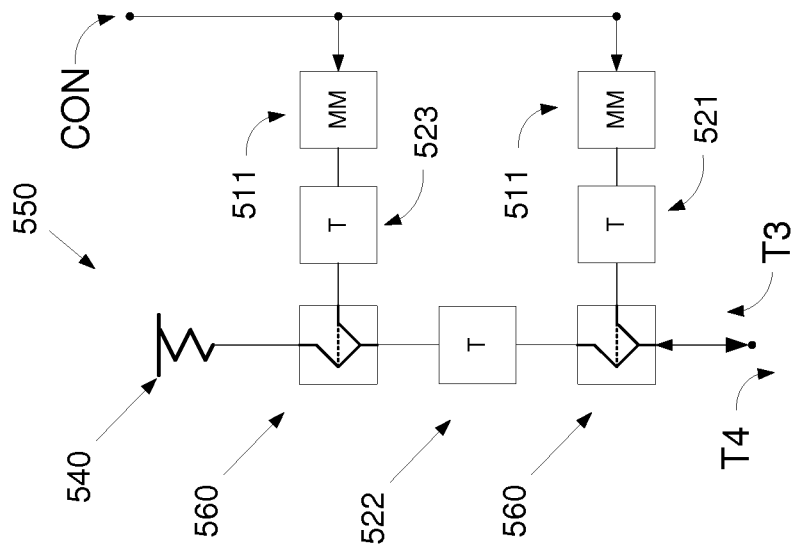
FIGS. 5*a* and 5*b* shows embodiments of a reflection type filter.
Figure 5A:
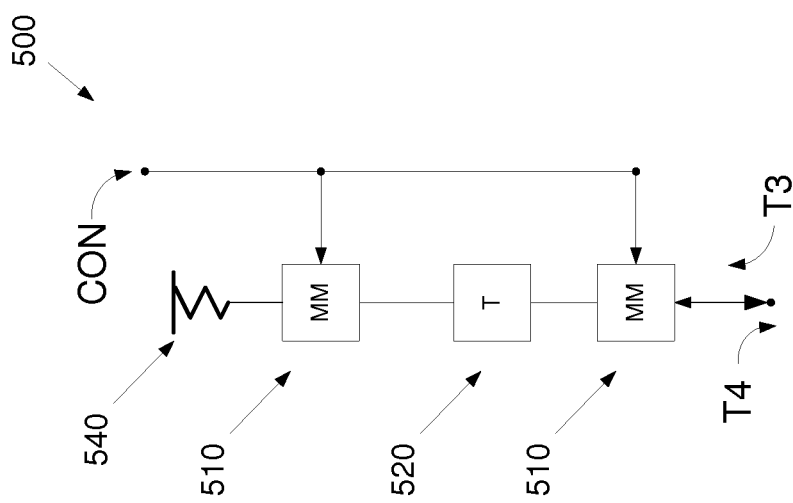

FIGS. 5a and 5b show two different embodiments of the reflective type filter 130' shown in FIG. 2 or the reflective type filter 410 shown in FIG. 4. The embodiment shown in FIG. 5a constitutes a chain of series-connected tunable mismatch circuits 510 connected to a reflection-less termination unit 540 arranged to make a reflectionless termination of said chain. The tunable mismatch circuits will be discussed in more detail in connection to FIG. 10a and FIG. 10b.

Each of the tunable mismatch circuits 510, 511 is arranged to generate a reflected signal with tunable phase and amplitude following the setting of the first control signal CON, and to forward the remaining part of the signal. FIG. 5a also shows delay sections 520 added between the mismatch circuits in order to reduce the number of mismatch circuits. Said delay sections 520 are, according to an aspect, fixed delay sections, i.e., the delay provided by the delay section 520 is not necessarily tunable.

According to aspects, the delay section can be implemented in a different technology than that used for the mismatch circuits, in order to achieve low insertion loss. Also, the delay section may or may not provide tuning of the delay time.

The embodiment shown in FIG. 5b constitutes a branching-and-delay network 550 connected to at least one tunable mismatch circuit 511. The branching-and-delay network 550 is arranged to divide a filter input signal, i.e., the second part of the transmit signal T3 and to forward a part of the divided filter input signal to each of the at least one tunable mismatch circuits 511. The branching-and-delay network 550 is also arranged to combine at least one output reflected signal from the at least one tunable mismatch circuit 511 into an output first filtered signal T4. Each of the at least one tunable mismatch circuit 511 is arranged to generate a reflected signal with tunable phase and amplitude. FIG. 5b also shows delay sections 521, 522, 523 added between splitters 560, and between splitters 560 and mismatch circuits 511.

According to an aspect, the delay sections 521, 522, 523 shown in FIG. 5b are tunable in the provided delay.

Note that the mismatch circuits 511 shown in FIG. 5b are somewhat different from the mismatch circuits 510 shown in FIG. 5a, e.g., in that the number of ports differ. The mismatch circuit 511 shown in FIG. 5b is assumed to comprise suitable termination circuitry.

Note also that neither of the delay sections 521, 522, 523 are essential in order for the branching and delay network 550 to function as intended. Thus, either of the delay sections 521, 522, 523 can be removed from the branching and delay network 550 without significant loss of functionality.

According to aspects, there is amplification in the mismatch circuits in FIG. 5a and FIG. 5b. In FIG. 5b this means that the mismatch circuit comprises a reflection-amplifier, which reflection-amplifier is able to generate a reflected signal which is stronger than the incident signal. In FIG. 5a this means that there is a bi-directional amplifier which amplifies waves traveling through the mismatch circuit, at least in one direction.

Figure 6:
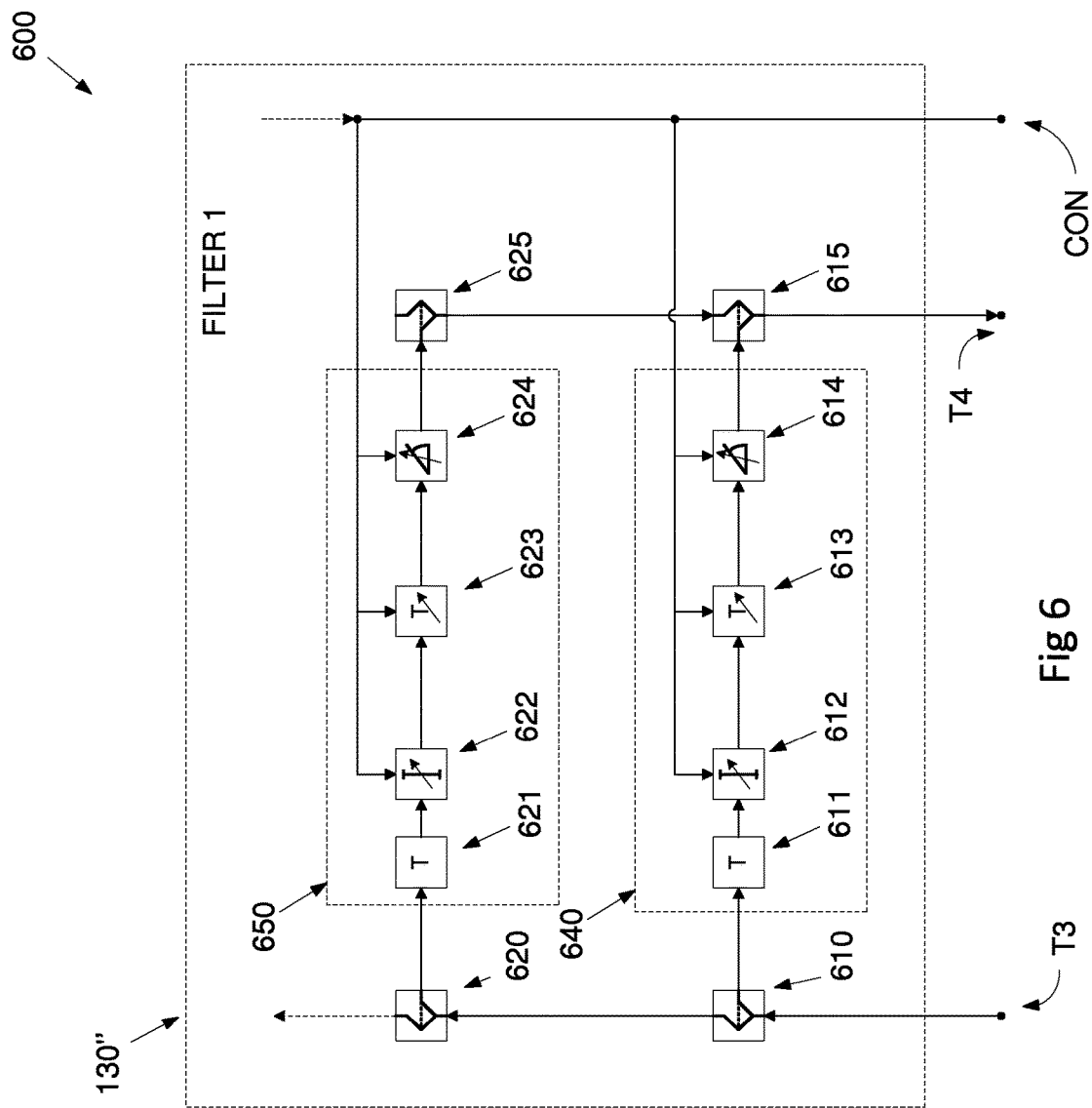
FIG. 6 shows an embodiment of a transmission type filter, and FIG. 7 schematically shows a microwave transceiver.

FIG. 6 shows an embodiment of the transmission type filter 130" of FIG. 3. The transmission type filter 130" shown in FIG. 6 comprises a filter with the topology of a Finite Impulse Response filter, a FIR filter, with at least two filter taps 640, 650.

According to various aspects, each of the taps 640, 650 are arranged to receive and to individually adjust the second part of the transmit signal T3 in terms of either of gain 622, delay 623, and phase 624 by the first control signal CON. The transmission type filter 130" is also arranged to combine 625, 615 an output signal from each filter tap 610, 620 to obtain the first filtered signal T4.

According to an aspect also the delay section 621 can be adjusted in each tap. Optionally there can be amplifiers in each branch for the purpose of improving noise figure and for the purpose of keeping the signal strength up in parity with the corresponding interference component to cancel.

The FIR topology filter shown in FIG. 6 comprises a first signal tap 640, and a second signal tap 650. Each signal tap receives part of the second part of the transmit signal T3 from the duplex coupler 120. The second part of the transmit signal T3 is suitably divided between taps by means of signal splitters 610, 620, or a divider network with multiple ports. Each signal tap further comprises a fixed delay element 611, 621 for delaying the input signal, suitably in a staggered manner, i.e. the first signal tap has the lowest delay while the second signal tap has a larger delay, and any additional taps each have larger delay than its predecessor.

According to an aspect, part or all of said delay can be implemented between signal splitters 610, 620. The "delay stagger" can also be in the opposite direction, i.e. each tap has a larger delay than its predecessor.

As mentioned above, according to various aspects, each signal tap also comprises either of a tunable gain unit 612, 622, a tunable delay unit 613, 623, and a tunable phase shift unit 614, 624. By control of said gain, delay and phase units by the first control signal CON, the transfer function of the filter 130" can be adapted.

In embodiments, components in the first adaptive filter 130" may be implemented in microstrip technology, coaxial line technology, waveguide technology, or on an integrated circuit Different technologies can be combined, with e.g. tuning elements in an integrated circuit or as discrete varactor devices, and delay elements and couplers in microstrip technology or in substrate integrated waveguide, SIW, technology.

It should be noted that the number of taps in the first adaptive filter 130" determines the resolution with which the transfer function of the filter 130" can be adapted. The more taps the first adaptive filter 130" comprises, the more degrees of freedom in adapting the filter transfer function. This freedom corresponds to more suppression and/or more bandwidth. Consequently, the first adaptive filter 130" may in embodiments contain more than two signal taps.

The output of each signal tap 640, 650 is combined into the first filtered signal T4 by means of signal combiners 615, 625, and the first filtered signal is arranged to be an output signal of the first adaptive filter 130". All tunable elements in the first adaptive filter 130" are arranged to be adapted by a control signal, in this case the first control signal CON mentioned in connection with FIG. 1, which first control signal CON is arranged to be an input signal to the first adaptive filter 130".

The first control signal CON received by the first adaptive filter 130" may in embodiments be a digital signal, in which case the first adaptive filter 130" suitably comprises a digital to analog converter, DAC, arranged to convert the received (digital) first control signal CON into an analog signal for control of the respective tunable filter components, e.g., the tunable gain units 612, 622, the tunable delay units 613, 623, and the tunable phase units 614, 624.

Figure 7:
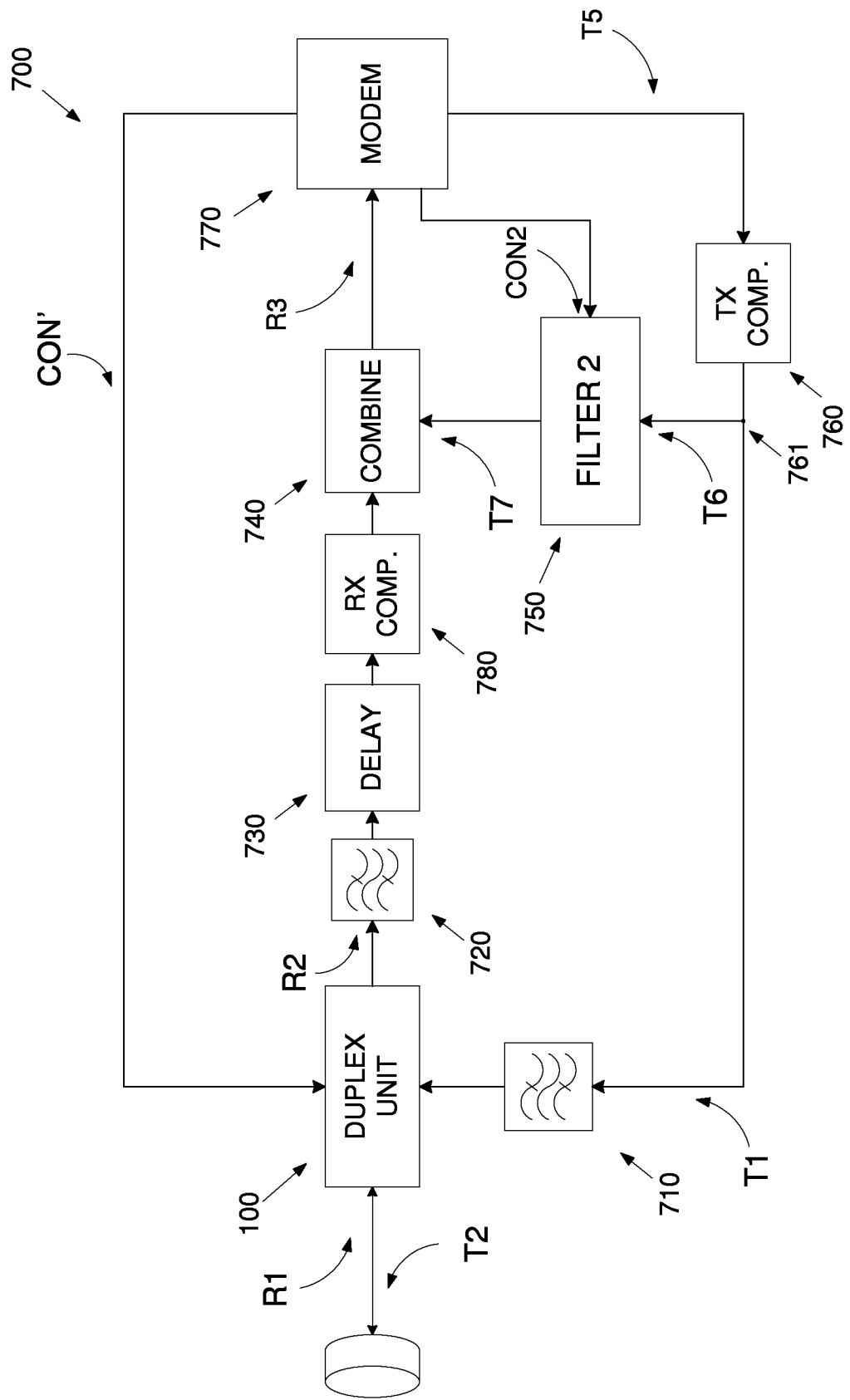

FIG. 7 shows a first embodiment of a microwave transceiver unit 700 comprising the duplex unit 100 of FIG. 1, for which reason components described in connection to the embodiment of the duplex unit 100 will not be described in detail here again. The microwave transceiver unit 700 further comprises first 710 and second 720 band-pass filters, a second delay unit 730 and a second combiner unit 740, as well as a second adaptive filter 750 and a transmit component 760 as well as a receive component 780.

It should be noted that the first 710 and second 720 band-pass filters are not required in order for the system to function, but may improve performance in some cases, e.g., when external interference is strong, or to fulfill out-of band emission requirements from the transmitter, or to relax the requirement on cancellation bandwidth In the microwave transceiver unit 700, the modem unit 770 is arranged to generate a basic transmit signal T5. The transmit component 760 may be a power amplifier, P-A, or any other component which comprises analog devices that add noise to the basic transmit signal T5, i.e. a low noise amplifier, a mixer or an active filter. The noise added to the basic transmit signal by the transmit component 760 is usually wide-band compared to the bandwidth of the basic transmit signal itself, i.e., the added noise usually contains frequency components located outside of the frequency band in which the basic transmit signal generated by the modem unit 770 resides.

Despite the fact that the first adaptive filter 130 of the duplex unit 100 is arranged to be adapted such that an interference stemming from the basic transmit signal is suppressed in the interference suppressed receive signal some interference may remain in the interference suppressed receive signal. The microwave transceiver unit 700 therefore comprises additional means by which such remaining interference in the received signal may be suppressed, as will be further described below.

In order to further suppress interference in the interference suppressed receive signal after band-pass filtering by the band-pass filter 720, a second adaptive filter 750 is comprised in the microwave transceiver unit 700. The second adaptive filter 750 is arranged to receive and to filter a part T6 of the output signal from the transmit component 760. This part T6 of the output signal from the transmit component 760 will be referred to as the back-channel signal when discussed in relation to FIG. 7. The output of the transmit component is also arranged to be transmitted towards the duplex unit 100 where it is arranged to be used as the transmit signal T1 of the duplex unit 100.

The microwave transceiver unit 700 also comprises a second delay unit 730 arranged to delay the interference suppressed receive signal by an amount corresponding to the delay incurred by the second adaptive filter 750. In addition, the microwave transceiver unit 700 comprises a second combiner unit 740 arranged to obtain the sum of the filtered signal output from the second adaptive filter 750 and the delayed interference suppressed receive signal in order to create a processed receive signal, which processed receive signal is arranged to be input to the modem unit 770.

As with the first adaptive filter described above, the second adaptive filter 750 is arranged to be adapted by means of a second control signal CON2 generated by the modem unit 770 in a manner previously described in connection to the first adaptive filter 130. As mentioned in connection to FIG. 1, a number of ways exist in which an adaptive filter may be adapted in order to suppress interference in a signal such as the processed receive signal R3. The methods mentioned for control of the first adaptive filter 130 may also be employed for the control of the second adaptive filter 750. It should be noted, however, that these methods for control of an adaptive filters are only included by way of example, and that this list of methods for control of an adaptive filter is by no means exhaustive.

In embodiments, the second adaptive filter 750, the second delay unit 730, and the second combiner unit 740 are all comprised in the modem unit 770, where they are implemented as digital components.

It should be noted that the microwave transceiver 700, according to aspects, utilizes the back-channel signal which is taken after the transmit component 760, for adaptive filtering by the second adaptive filter 750 in order to suppress interference in the interference suppressed receive signal, instead of using the generated basic transmit signal directly. An important difference between using the basic transmit signal before the transmit component 760 and the transmit signal after the transmit component 760 is that interference added by the transmit component 760 is also filtered by the second adaptive filter 750, and can therefore be suppressed in the processed receive signal.

According to aspects, the microwave transceiver 700 utilizes the back-channel signal which is taken after the transmit component 760 in addition to the generated basic transmit signal, for adaptive filtering in order to suppress interference in the interference suppressed receive signal.

The common denominator in the various embodiments of the transmit component 760 is that noise is added to a signal, e.g., the basic transmit signal T5, as it propagates through the transmit component. This added noise can be expected to leak into the processed receive signal. Therefore, in order to be able to suppress this noise in the processed receive signal, it is necessary to use the signal after the transmit component as the signal which is arranged to be filtered by the second adaptive filter 750 and which is used to suppress noise in the processed receive signal.

According to an aspect, the microwave transceiver 700 further comprises an up-converter, not explicitly shown in FIG. 7, arranged to up-convert the basic transmit signal prior to being received by the transmit component 760.

According to an aspect, said up-converter is comprised in the transmit component 760.

The microwave transceiver 700 also comprises a first and a second down-converter, not explicitly shown in FIG. 7, arranged to down-convert the back-channel signal and the band-pass filtered interference suppressed receive signal, respectively.

According to an aspect, the down-converter is comprised in the receive component 780.

By up-conversion and down-conversion of a signal we here mean moving the signal up or down in frequency, e.g. by multiplication of a sinusoid signal at a given frequency, suitably followed by filtering of the obtained product signal. Thus, a radio frequency signal may by means of a down converter be down-converted to an intermediate frequency signal or to a baseband signal, and vice versa, intermediate frequency signals or baseband signals may be up-converted to radio frequency signals by means of up-converters.

According to an aspect, the receive component 780 is disposed between the second delay unit 730 and the second combiner unit 740. The receive component 780 comprises a low noise amplifier, LNA, and a frequency down-conversion arrangement adapted to convert the frequency of an input signal down to an intermediate frequency or a baseband frequency.

According to an aspect of the microwave transceiver unit 700, a first channel selection filtering is comprised arranged to filter out a pre-determined frequency band of the processed receive signal R3 and to suppress other frequency bands. The first channel selection filtering, not shown in FIG. 7, is made after down-conversion by the receive component 780. A benefit of such first channel selection filtering arranged after down-conversion is that an analog to digital converter arranged to convert the processed receive signal R3 into the digital domain need not be designed to handle interferences such as wide-band noise originating at least in part from the transmit component 760. With such a solution bandwidth requirements on the cancellation arrangement is reduced dramatically since un-cancelled transmit noise will be suppressed in the first channel selection filter, before it reaches the analog to digital converter.

According to an aspect of the microwave transceiver 700, a second channel selection filtering is comprised. The second channel selection filtering is made after analog to digital conversion of the processed receive signal R3. It is noted that in case channel selection filtering is done exclusively after analog to digital conversion, then the requirements on the analog to digital converter arrangement will increase as more signal power needs to be acquired into the digital domain from the analog domain, in particular in case the bandwidth of the canceller is small, such that much of the transmit noise is un-cancelled Consequently, the microwave transceiver 700 shown in FIG. 7 is thus able to suppress an interference, originating from the transmit signal T1, in the processed receive signal R3 by means of two serially connected interference cancellation stages. The first interference cancellation stage comprising the first adaptive filter 130 implemented in the duplex unit 100, the second interference cancellation stage comprising the second adaptive filter 750.

The second interference cancellation stage can be at an intermediate frequency or at baseband, and it can be made in different technology than the first.

Thus, a microwave transceiver unit 700 for the simultaneous transmission and reception of microwave signals on at least partly overlapping frequency bands is shown in FIG. 7. The transceiver unit 700 comprises a modem unit 770 and a duplex unit 100. The modem unit 700 is arranged to generate a basic transmit signal T5 and to receive a processed receive signal R3. The control unit 180 of the duplex unit 100 is arranged to generate a control signal CON based on a second control signal CON' generated by the modem unit 770. The microwave transceiver unit 700 also comprises a second adaptive filter 750 and a transmit component 760. The transmit component 760 is arranged to receive the basic transmit signal T5 from the modem unit 770 and to generate a transmit component output signal arranged to be divided into the transmit signal T1 of the duplex unit and into an input signal of the second adaptive filter T6. The microwave transceiver unit 700 is also arranged to delay the interference suppressed receive signal R2 of the duplex unit 100 by a pre-determined amount corresponding to the delay of the second adaptive filter 750, and to also obtain as the processed receive signal R3 a combination of the delayed interference suppressed receive signal and a second filtered signal T7 from the second adaptive filter 750. The modem unit 770 is arranged to adapt the second adaptive filter 750 by a second control signal CON', and to generate the second control signal CON' to make the processed receive signal R3 equal to the payload signal.

Thus, in a manner similar to the interference suppression performed by means of the first adaptive filter comprised in the duplex unit 100 described above, the second adaptive filter 750 comprised in the disclosed microwave transceiver 700 is used in order to suppress any residual interference in the interference suppressed receive signal.

Figure 8:
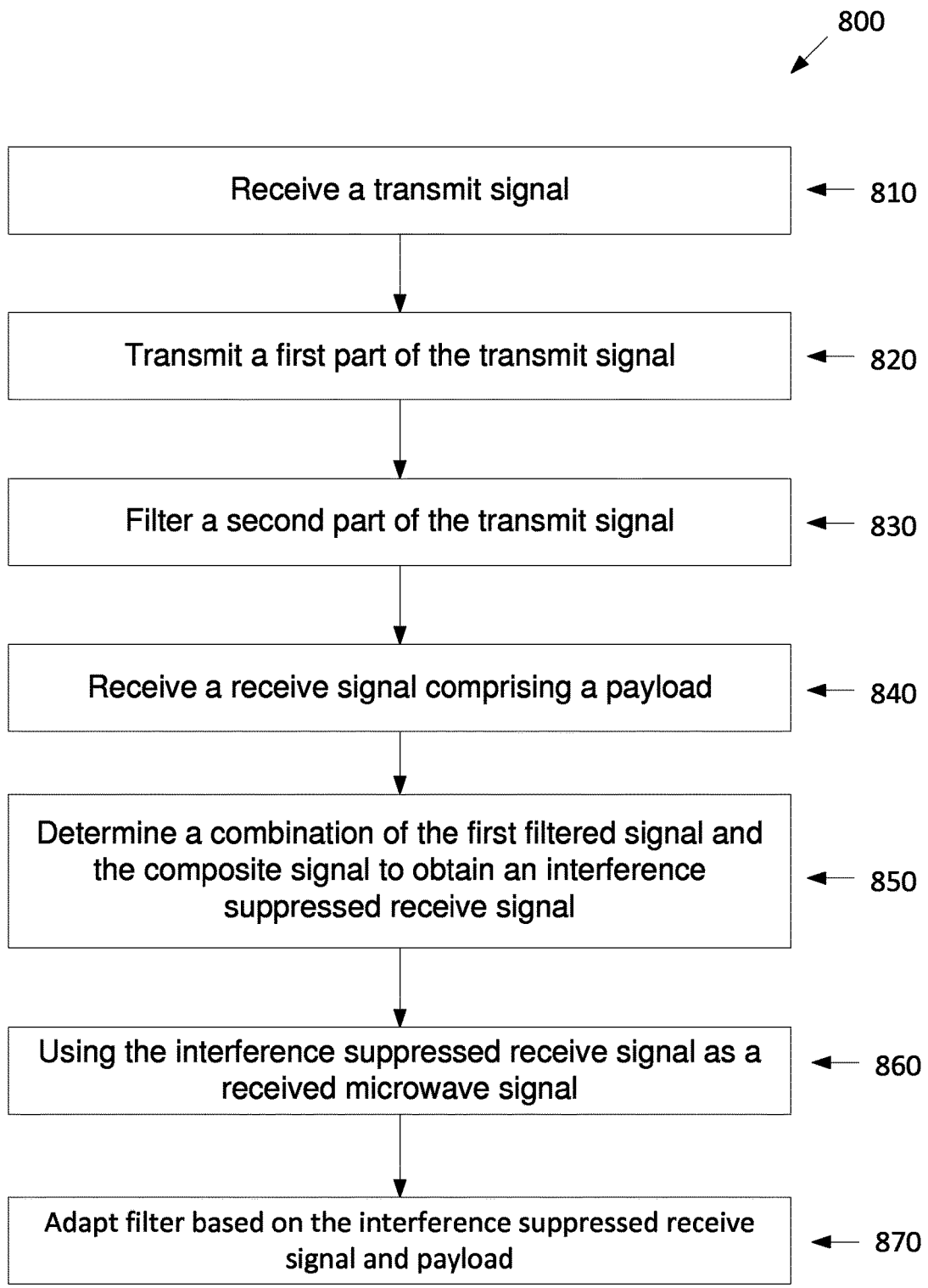
FIG. 8-9 are flowcharts illustrating embodiments of a method of the disclosure.

FIG. 8 shows a flowchart of a method 800 for the simultaneous transmission and reception of microwave signals on at least partly overlapping frequency bands. The method 800 comprises the steps of receiving 810, in a duplex coupler, a microwave transmit signal, and transmitting 820, from said duplex coupler, a first part of the microwave transmit signal via an antenna. The method also comprises the steps of filtering 830, by a first adaptive filter, a second part of the microwave transmit signal in order to generate a first filtered signal, and also receiving 840 a receive signal comprising a payload signal via the antenna, as well as determining 850 a combination of the first filtered signal and the delayed composite signal to obtain an interference suppressed receive signal. The method also comprises the steps of using 860 the interference suppressed receive signal as a received microwave signal, and adapting 870 the first adaptive filter by means of the received microwave signal in order to make the interference suppressed receive signal equal to the payload signal.

According to an aspect, the step of filtering 830 further comprises using as said first adaptive filter an analog tunable filter arranged to generate an analog filtered output signal.

Figure 9:
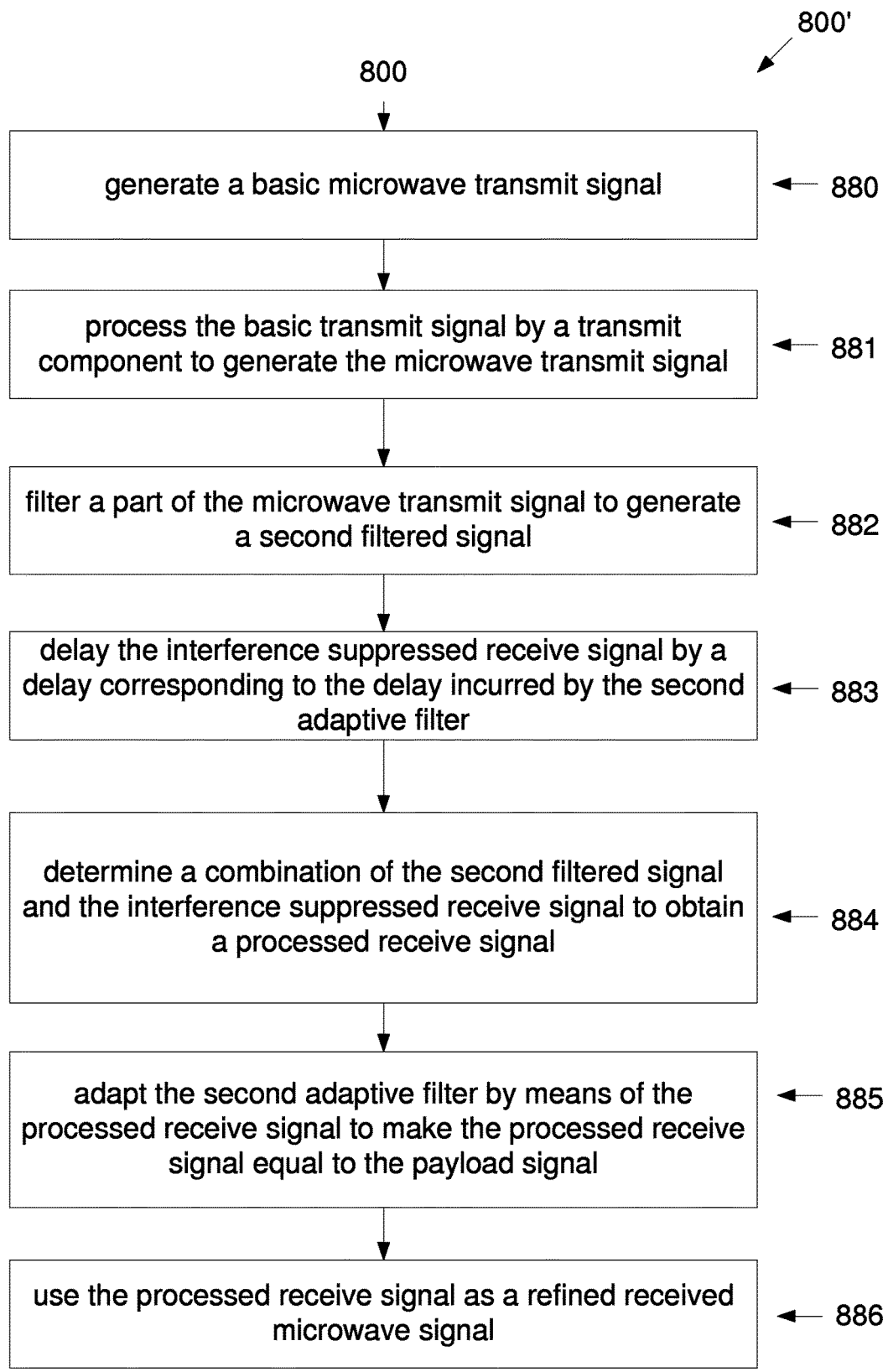

FIG. 9 shows a flowchart of an aspect of the method 800 further comprising the steps of generating 880 a basic microwave transmit signal, processing 881 said basic transmit signal by a transmit component to generate said microwave transmit signal, and filtering 882, by a second adaptive filter, a part of the microwave transmit signal to generate a second filtered signal. The method further comprises the steps of delaying 883 the interference suppressed receive signal by a delay corresponding to the delay incurred by the second adaptive filter, and determining 884 a combination of the second filtered signal and the interference suppressed receive signal to obtain a processed receive signal, as well as adapting 885 the second adaptive filter by means of the processed receive signal to make the processed receive signal equal to the payload signal, and also using 886 the processed receive signal as a refined received microwave signal.

Thus, the first filtered signal is based on the transmitted signal, but filtered by an adaptive filter, and accordingly, the filtered transmit signal can be seen as a sum of signal components, where each signal component is a copy of the transmit signal, but has a variable delay, a variable phase shift, and a variable gain. The filtered transmit signal may therefore be made to resemble a sum of interference terms, as long as each interference term originates from the transmit signal.

The received signal can be expected to comprise a plurality of signal components, among which are a payload signal, and in all likelihood also a number of copies of the transmit signal, with each copy having a different phase, delay, and gain. One such copy may arise due to un-intentional signal leakage during the step of transmitting 820 a first part of the transmit signal. Another such copy can be expected due to signal reflections in the antenna. Yet another such copy may arise due to reflections in the physical surrounding of the antenna, i.e. in the radio propagation environment in which the antenna is deployed.

In an ideal case, each un-wanted signal component comprised in the composite signal has a corresponding 'negative' or 'out-of-phase' signal component with the same amplitude and delay comprised in the filtered signal, such that each un-wanted signal component in the composite signal is cancelled by its corresponding signal component in the filtered signal. If there are some un-wanted signal components remaining in the interference suppressed receive signal, then the adaptive filter is suitably adapted, i.e., the phase, gain, and delay of signal components in the filtered signal are changed, in order to suppress un-wanted components until the interference suppressed receive signal only contains the payload.

As shown in FIG. 8 and FIG. 9, the method 800 is continuous in the sense that all steps of the method are repeated indefinitely.

It should be mentioned that the order of the steps of the method 700 shown in FIG. 7 is an example only, and that the steps of the method 700 may be performed in another order while still being within the scope of the disclosure.

Figure 10B:
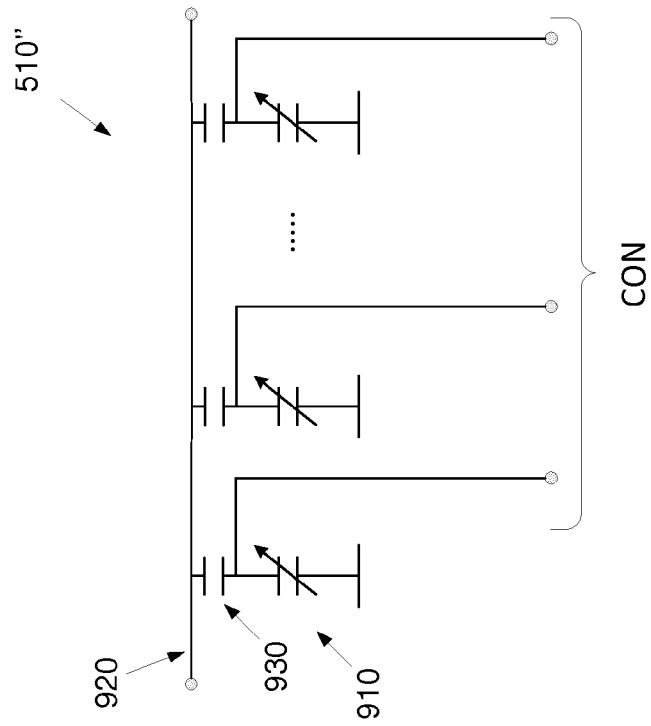
FIG. 10 shows exemplary embodiments of a mismatch circuit for a reflection type filter.
Figure 10A:
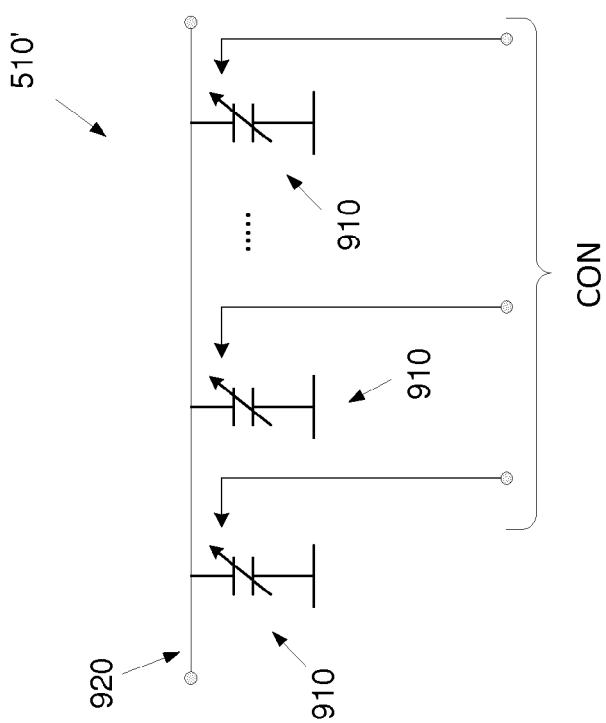

FIGS. 10*a* and 10*b* show two embodiments 510', 510" of the tunable mismatch circuits 510 discussed in connection with FIG. 5*a* and FIG. 5*b*. The example circuits shown in FIGS. 10*a* and 10*b* comprises variable capacitors 910 distributed along a transmission line 920, over an electrical distance exceeding half a wave-length of the signal arranged to traverse the transmission line 920, which causes a back reflection with controllable amplitude and phase along the transmission line 920, with the phase of reflection from one of the capacitors being determined by its position along the line, and the amplitude of the reflection being determined by the capacitance value.

According to various aspects the variable capacitor 910 can be implemented by a semiconductor varactor, MEMS varactor, transistor arrangement or switched capacitor network. FIG. 10b shows in more detail how DC-decoupling and biasing can be arranged for a varactor based solution 510". FIG. 10b further comprising an additional capacitor 930.

In embodiments, coupling to the transmission line 920 can be made via an inductance from a bond wire or package lead, or it can be made through a directional coupler.

The tunable mismatch circuit 510, 510', 510" can be implemented as a network of discrete tunable components on a circuit board or in a waveguide, or several tunable mismatch circuits can be integrated on a common integrated circuit with multiple terminals connecting to delay lines.

In embodiments the tunable mismatch circuit 510, 510', 510" can further comprise amplification components, such as reflection amplifiers or bi-directional amplifiers.

It should be noted that the use of a reflection type filter significantly simplifies the design of the adaptive filter and can provide lower insertion loss. For a reflection type filter requirements exist only related to creating a controlled back reflection, while there are no strict requirements on the transmission properties of the filter. For a transmission type filter, on the other hand, we have requirement both on controlling the transmitted signal, and on keeping the back reflection to a minimum. In addition, in order to create a weak reflection there is no need to use a long transmission line, with associated insertion loss, which is the case for a transmission type phase shifter.

Figure 11B:
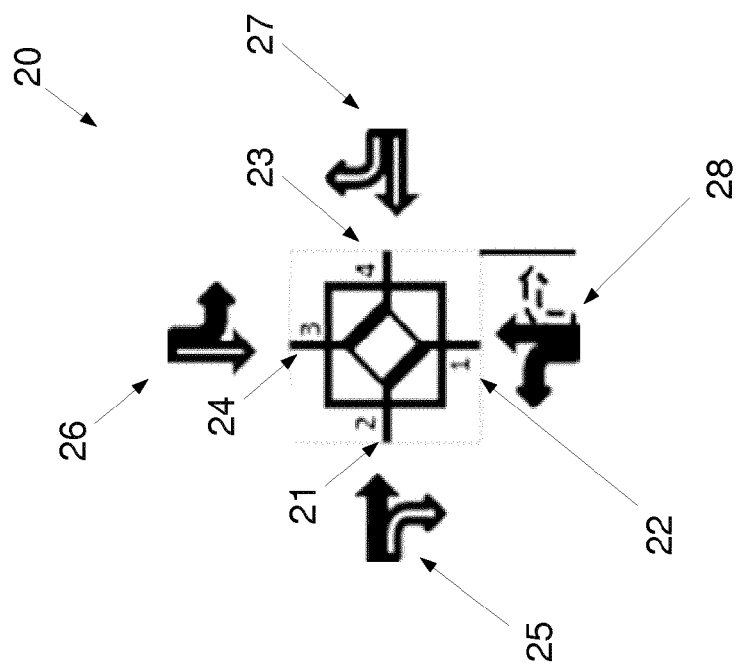
FIG. 11 shows exemplary embodiments of an antenna coupler.
Figure 11A:
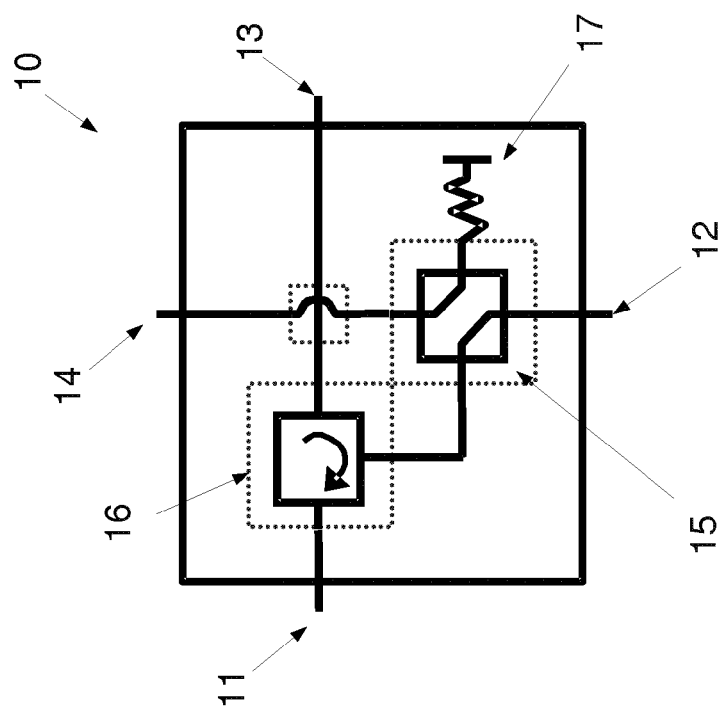

FIGS. 11a and 11b show examples of two types of antenna couplers 10, 20.

The antenna coupler 10 shown in FIG. 11a comprises an input port 12, a first 13 and a second 14 output port and an antenna port 11. The antenna coupler 10 is arranged to provide a signal conduit between the input port 12 and the antenna port 11 via a circulator unit 16 as well as the second output port 14 by using a splitter or coupler unit 15. The antenna coupler 10 is further arranged to provide isolation from the input port 12 to the first output port 13. The antenna coupler 10 is also arranged to provide a signal conduit from the antenna port 11 via the circulator 16 to a first output port 13. The antenna coupler 10 further comprising a reflectionless termination unit 17 arranged to a conduit from the second output port 14.

The antenna coupler 20 shown in FIG. 11b is in the form of a 90-degree hybrid coupler. The antenna coupler 20 comprises four ports; an input port 22 corresponding to the input port 1 of a 90-degree hybrid, a first output port 23 corresponding to the isolated port 4 of a 90-degree hybrid, a antenna port 21 corresponding to the 90-degree output port 2 of a 90-degree hybrid, and a second output port 24 corresponding to the 180 degree output port 3 of a 90-degree hybrid. Arrows 25-28 have been used to mark signal conduits and signal blockages for the different ports 21-24, with filled arrows indicating essential signal conduit, empty arrows indicating existing but not essential signal conduits, and dashed arrows with a stop-line indicating necessary blocking.

The arrow 28 of the input port 22 indicates that a signal conduit is present from the input port 22 to the antenna port 21 and to the second output port 24, with signal blockage to the first output port 23.

The arrow 25 of the antenna port 21 indicates that a signal conduit is present to the first output port 23 as well as an un-used signal conduit to the input port 22.

The arrow 26 of the second output port 24 indicates a signal conduit to the first output port 23 and an un-used signal conduit to the input port 21.

The arrow 27 of the first output port 23 indicates un-used signal conduits to the second output port 24 and to the antenna port 21.

There is an important difference between the antenna coupler 10 shown in FIG. 11a and the antenna coupler 20 shown in FIG. 11b. The duplex coupler arrangement 120' shown in FIG. 2 requires an antenna coupler 20 of the type shown in FIG. 11b, since there must be a signal conduit from the second output port 24 to the first output port 23, which corresponds to the signal conduit from the return port 125' to the first output port 123 in FIG. 2. The other two duplex coupler arrangements 120", 120''' have a separate physical interface for the return port 125", 125''', which allows the use of any of the two types of antenna couplers 10, 20 shown in FIG. 11a and in FIG. 11b.

According to various aspects, the antenna coupler 20 shown in FIG. 11b is implemented, instead of a 90-degree hybrid, as a 180 degree hybrid, a balun, a magic tee, a coupled line coupler, or a Lange coupler.

Embodiments of the disclosure are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In the drawings and specification, there have been disclosed exemplary embodiments of the disclosure. However, many variations and modifications can be made to these embodiments without substantially departing from the principles of the present technique. Accordingly, although specific terms are employed, they are used in a generic and descriptive sense only and not for purposes of limitation.

The disclosure is not limited to the examples of embodiments described above and shown in the drawings, but may be freely varied within the scope of the appended claims.

The invention claimed is:

1. A duplex unit for simultaneous transmission and reception of microwave signals, the duplex unit comprising:
   an interference canceller unit; and
   a control unit;
   wherein the interference canceller unit comprises:
      a duplex coupler with an antenna port, an input port, a first and a second output port and a return port; and
      a first adaptive filter;
   wherein the duplex coupler is arranged to:
      receive a transmit signal at the input port and output a first part of the transmit signal at the antenna port, and suppress leakage of the transmit signal to the first output port; and
      output a second part of the transmit signal at the second output port to be received by the first adaptive filter;
   wherein the first adaptive filter is arranged to output a first filtered signal to the return port;
   wherein the duplex coupler is further arranged to receive a receive signal comprising a payload signal at the antenna port, and to output a combination of the receive signal and the first filtered signal as an interference suppressed receive signal on the first output port; and
   wherein the control unit is arranged to use the interference suppressed receive signal to adapt the first adaptive filter by a first control signal to make the interference suppressed receive signal equal to the payload signal.

2. The duplex unit of claim 1, wherein the duplex unit is arranged for the simultaneous transmission and reception of microwave signals on at least partly overlapping frequency bands.

3. The duplex unit of claim 1, wherein the first adaptive filter constitutes an analog adaptive filter arranged to receive and to filter an analog second part of the transmit signal, and to output an analog first filtered signal.

4. The duplex unit of claim 1, wherein the second output port and the return port constitute a single physical interface; and
   wherein the first adaptive filter of the interference canceller unit comprises a first reflection type filter arranged to receive the second part of the transmit signal and to output a reflected filtered transmit signal back to said single physical interface as the first filtered signal.

5. The duplex unit of claim 4, wherein the reflection type filter comprises a chain of series-connected tunable mismatch circuits connected to a reflection-less termination unit arranged to terminate said chain, the chain of series-connected tunable mismatch circuits being arranged to generate a back-reflected signal with tunable phase and amplitude.

6. The duplex unit of claim 4, wherein the reflection type filter comprises a branching-and-delay network connected to at least one tunable mismatch circuit;
   wherein the branching-and-delay network is arranged to:
      divide a filter input signal and forward a part of the divided filter input signal to each of the at least one tunable mismatch circuits; and
      combine at least one output reflected signal from the at least one tunable mismatch circuit into an output first filtered signal;
   wherein each of the at least one tunable mismatch circuits is arranged to generate a reflected signal with tunable phase and amplitude.

7. The duplex unit of claim 1, wherein the first adaptive filter comprises a transmission type filter;
   wherein the duplex coupler further comprises a first combiner unit arranged to combine the receive signal and the first filtered signal to obtain the interference suppressed receive signal and physically separate the second output port and the return port;
   wherein the duplex coupler further comprises an antenna coupler, the antenna coupler arranged to provide a signal conduit from the input port to the antenna port and also from the input port to the second output port, as well as from the antenna port towards the combiner, while blocking signal conduit from the input port to the combiner.

8. The duplex unit of claim 7, wherein the first adaptive filter comprises:
   a second reflection type filter; and
   a circulator, the circulator arranged to:
      provide a signal conduit from the second output port to an input port of the second reflection type filter;
      provide a signal conduit from the output port of the second reflective filter to the return port; and
      block a direct signal conduit from the second output port to the return port.

9. The duplex unit of claim 7, wherein the transmission type filter comprises a filter with the topology of a Finite Impulse Response filter with at least two filter taps, each of said taps arranged to receive and to individually adjust the second part of the transmit signal in terms of gain and phase by the first control signal; and
   wherein the transmission type filter is further arranged to combine an output signal from each filter tap to obtain the first filtered signal.

10. A microwave transceiver for simultaneous transmission and reception of microwave signals on at least partly overlapping frequency bands, the microwave transceiver comprising:
    a modem unit; and
    duplex unit comprising an interference canceller unit and a control unit;
    wherein the modem unit is arranged to generate a basic transmit signal and to receive a processed receive signal;
    wherein the control unit of the duplex unit is arranged to generate a control signal based on a second control signal generated by the modem unit,
    wherein the microwave transceiver further comprises a second adaptive filter and a transmit component;
    wherein the transmit component is arranged to receive the basic transmit signal from the modem and to generate a transmit component output signal arranged to be divided into the transmit signal of the duplex unit and into an input signal of the second adaptive filter;
    wherein the microwave transceiver is further arranged to delay the interference suppressed receive signal of the duplex unit by a pre-determined amount set in relation to the delay of the second adaptive filter, and to also obtain as the processed receive signal a combination of the delayed interference suppressed receive signal and a second filtered signal from the second adaptive filter;
    wherein the modem unit is further arranged to adapt the second adaptive filter by a second control signal, and to generate the second control signal to make the processed receive signal equal to the payload signal.

11. The microwave transceiver of claim 10, wherein the transmit component comprises one or more of an amplifier, a mixer, and a low-pass filter.

12. The microwave transceiver of claim 10, further comprising a first and a second band-pass filter, the first band-pass filter arranged to band-pass filter the transmit signal of the duplex unit, and the second band-pass filter arranged to band-pass filter the interference suppressed receive signal of the duplex unit.

13. The microwave transceiver of claim 12, wherein the first and second band-pass filters are arranged to have a first and a second pass-band, respectively, arranged to overlap each other at least in part.

14. A method for simultaneous transmission and reception of microwave signals on at least partly overlapping frequency bands, the method comprising:
receiving, in a duplex coupler, a microwave transmit signal;
transmitting, from said duplex coupler, a first part of the microwave transmit signal via an antenna;
filtering, by a first adaptive filter, a second part of the microwave transmit signal in order to generate a first filtered signal;
receiving a receive signal comprising a payload signal via the antenna;
determining a combination of the first filtered signal and the composite signal to obtain an interference suppressed receive signal;
using the interference suppressed receive signal as a received microwave signal; and
adapting the first adaptive filter by the received microwave signal in order to make the interference suppressed receive signal equal to the payload signal.

15. The method of claim 14, wherein the step of filtering further comprises using as said first adaptive filter an analog tunable filter arranged to generate an analog filtered output signal.

16. The method of claim 14, further comprising:
generating a basic microwave transmit signal;
processing said basic transmit signal by a transmit component to generate said microwave transmit signal;
filtering, by a second adaptive filter, a part of the microwave transmit signal to generate a second filtered signal;
delaying the interference suppressed receive signal by a delay corresponding to the delay incurred by the second adaptive filter;
determining a combination of the second filtered signal and the interference suppressed receive signal to obtain a processed receive signal;
adapting the second adaptive filter by means of the processed receive signal to make the processed receive signal equal to the payload signal; and
using the processed receive signal as a refined received microwave signal.

* * * * *